US012385644B2

(12) United States Patent
Colston et al.

(10) Patent No.: US 12,385,644 B2
(45) Date of Patent: *Aug. 12, 2025

(54) SELF-CLEANING GRILLING DEVICES

(71) Applicant: Traeger Pellet Grills, LLC, Salt Lake City, UT (US)

(72) Inventors: Michael V. Colston, Salt Lake City, UT (US); Daniel A. C. Altenritter, Layton, UT (US); Daniel W. Sluder, Salt Lake City, UT (US)

(73) Assignee: Traeger Pellet Grills, LLC, Salt Lake City, UT (US)

( * ) Notice: Subject to any disclaimer, the term of this patent is extended or adjusted under 35 U.S.C. 154(b) by 41 days.

This patent is subject to a terminal disclaimer.

(21) Appl. No.: 17/456,263

(22) Filed: Nov. 23, 2021

(65) Prior Publication Data

US 2022/0082262 A1 Mar. 17, 2022

Related U.S. Application Data

(63) Continuation of application No. 16/356,684, filed on Mar. 18, 2019, now Pat. No. 11,181,276.
(Continued)

(51) Int. Cl.
*F24B 13/00* (2006.01)
*A47J 37/07* (2006.01)
(Continued)

(52) U.S. Cl.
CPC ......... *F24B 13/006* (2013.01); *A47J 37/0704* (2013.01); *A47J 37/0786* (2013.01); *F24B 1/16* (2013.01); *F24B 15/00* (2013.01)

(58) Field of Classification Search
None
See application file for complete search history.

(56) References Cited

U.S. PATENT DOCUMENTS

| 165,943 | A | 7/1875 | Moore |
| 1,156,773 | A | 10/1915 | Gordon |

(Continued)

FOREIGN PATENT DOCUMENTS

| CN | 2314257 Y | * | 4/1999 |
| CN | 203744267 |   | 7/2014 |

(Continued)

OTHER PUBLICATIONS

Great Britain Search Report from Application No. 1904197, mailed May 28, 2019, 9 pages.
(Continued)

*Primary Examiner* — Jason Lau
(74) *Attorney, Agent, or Firm* — TraskBritt

(57) ABSTRACT

A firepot for a grilling device comprises one or more walls at least partially forming an outer boundary of the firepot. The firepot is structurally configured to hold at least partially ignited solid fuel. The firepot also comprises a floor defining, at least in part, a lower end of the firepot. The floor comprises one or more holes extending through the floor. Additionally, a portion of the one or more walls form a solid fuel delivery opening that comprises a solid fuel portal through which solid fuel is deliverable to an interior of the firepot. A heating element mount is positioned to hold a heating element within the interior of the firepot.

16 Claims, 11 Drawing Sheets

Related U.S. Application Data

(60) Provisional application No. 62/648,216, filed on Mar. 26, 2018, provisional application No. 62/648,213, filed on Mar. 26, 2018.

(51) Int. Cl.
*F24B 1/16* (2021.01)
*F24B 15/00* (2006.01)

(56) References Cited

U.S. PATENT DOCUMENTS

| | | | |
|---|---|---|---|
| 1,611,018 A | 12/1926 | Fuller | |
| 1,887,768 A * | 11/1932 | Maloney | F23J 1/00 |
| | | | 110/165 R |
| 1,983,709 A | 12/1934 | Schmidt | |
| 2,090,622 A | 8/1937 | Cruikshank | |
| 2,679,251 A | 5/1954 | Simmer | |
| 2,748,691 A | 6/1956 | Johnson | |
| 3,173,425 A | 3/1965 | Gregory | |
| 3,223,077 A | 12/1965 | Tsakos | |
| 3,251,345 A | 5/1966 | Henry et al. | |
| 3,521,549 A | 7/1970 | Funke | |
| 3,721,177 A | 3/1973 | Booker | |
| 4,363,674 A | 12/1982 | Fullenwider | |
| 4,507,546 A | 3/1985 | Fortune et al. | |
| 4,770,157 A | 9/1988 | Shepherd et al. | |
| 4,881,472 A | 11/1989 | Stromberger et al. | |
| 5,123,360 A * | 6/1992 | Burke | F24B 1/024 |
| | | | 126/61 |
| 5,168,860 A * | 12/1992 | Kibourian | A47J 37/0754 |
| | | | 126/41 R |
| 5,517,902 A | 5/1996 | Boston | |
| 5,582,094 A | 12/1996 | Peterson et al. | |
| 5,676,045 A | 10/1997 | Faraj | |
| 6,223,737 B1 | 5/2001 | Buckner | |
| 7,900,553 B1 | 3/2011 | Maurin | |
| 8,716,634 B2 | 5/2014 | Biller | |
| 9,140,448 B2 | 9/2015 | Freeman | |
| 9,289,096 B2 | 3/2016 | Barkhouse et al. | |
| 9,603,484 B2 | 3/2017 | Cleveland et al. | |
| 9,759,429 B2 | 9/2017 | Tucker | |
| 9,814,354 B2 | 11/2017 | McAdams et al. | |
| 2007/0137634 A1 | 6/2007 | Traeger et al. | |
| 2009/0107478 A1 | 4/2009 | Demars et al. | |
| 2009/0136638 A1 | 5/2009 | Fujie et al. | |
| 2009/0148801 A1 | 6/2009 | Wedermann | |
| 2011/0048398 A1 | 3/2011 | Christensen et al. | |
| 2011/0073101 A1 | 3/2011 | Lau et al. | |
| 2014/0318524 A1 | 10/2014 | Meason | |
| 2014/0326233 A1 | 11/2014 | Traeger | |
| 2014/0360387 A1 | 12/2014 | Bogdon | |
| 2016/0183722 A1 | 6/2016 | Fisher | |
| 2016/0327263 A1 | 11/2016 | Traeger | |
| 2017/0055549 A1 | 3/2017 | Jung | |
| 2017/0164783 A1 | 6/2017 | Sauerwein et al. | |
| 2017/0176018 A1 | 6/2017 | Traeger | |
| 2017/0196400 A1 | 7/2017 | Colston | |
| 2017/0238565 A1 | 8/2017 | Giebel et al. | |
| 2017/0238566 A1 | 8/2017 | Smith et al. | |
| 2017/0367515 A1 | 12/2017 | Cornelissen et al. | |
| 2018/0008093 A1 | 1/2018 | Parker et al. | |
| 2018/0110367 A1 | 4/2018 | Baker | |
| 2018/0296031 A1 | 10/2018 | Terrell et al. | |
| 2019/0008321 A1 | 1/2019 | Allmendinger | |
| 2019/0078806 A1 | 3/2019 | Looft | |
| 2019/0162411 A1 * | 5/2019 | Choi | A47J 37/0786 |

FOREIGN PATENT DOCUMENTS

| | | |
|---|---|---|
| CN | 204245967 U | 4/2015 |
| CN | 104921617 A | 9/2015 |
| CN | 107296519 A | 10/2017 |
| CN | 207049956 U | 2/2018 |
| DE | 102016211043 A1 | 12/2017 |
| EP | 0947903 A1 | 10/1999 |
| EP | 3066965 A1 | 9/2016 |
| GB | 2072887 A | 10/1981 |
| GB | 2501875 A | 11/2013 |
| KR | 20-0338453 | 1/2004 |
| KR | 10-0869071 B | 11/2008 |
| WO | 2018/191372 A1 | 10/2018 |

OTHER PUBLICATIONS

Great Britain Search Report from Application No. 1904199, mailed May 28, 2019, 8 pages.
Chinese First Office Action for Application No. 201910231675X dated Sep. 29, 2023, 8 pages.
Chinese Second Office Action for Application No. 201910231675.X dated Apr. 27, 2024, 21 pages with translation.
Great Britain Search Report from Application No. 1904200, mailed May 29, 2019, 8 pages.
Chinese Decision on Rejection for Application No. 201910226998X dated Sep. 27, 2024, 18 pages with English translation.

* cited by examiner

SELF-CLEANING GRILLING DEVICES

CROSS-REFERENCE TO RELATED APPLICATIONS

This application is a continuation of U.S. patent application Ser. No. 16/356,684, filed Mar. 18, 2019, now U.S. Pat. No. 11,181,276, issued Nov. 23, 2021, which claims priority to and the benefit of U.S. Provisional Application Ser. No. 62/648,216 entitled "Self-Cleaning Pellet Grill," filed on Mar. 26, 2018 and to U.S. Provisional Application Ser. No. 62/648,213 entitled "Grill with High Volume Clean Firepot," filed on Mar. 26, 2018, the entire content of each of the referenced applications is incorporated by reference herein in their entirety.

TECHNICAL FIELD

The present disclosure relates generally to systems, methods, and devices for grilling and warming food products.

BACKGROUND

Users often use grilling devices for cooking food, in particular, grilling and warming food products. The grill cavity of a pellet grill often includes a firepot to hold fuel, such as wood pellets or other fuel, for combustion. Firepots typically include an open container that may have holes in the sidewalls of the firepot for ventilation. Pellet grills typically have blowers that circulate air into and through the firepot to facilitate combustion of the fuel. The pellet grill produces ash when it combusts the fuel, as well as smoke that comprises creosote and soot. The grill further blows air into the firepot, which blows the ash out of the firepot. Over time, however, the ash, soot and creosote buildup in the grill cavity section of the grill with repeat use.

Ash build-up in the firepot, and elsewhere in the grill cavity of the grill, decreases the efficiency of fuel combustion and otherwise negatively impacts the grill. Users typically must clean out the ash by removing various components of the grill to access the firepot and grill cavity before removing the ash manually. Manually cleaning out the firepot and grill cavity of a grill is cumbersome, messy, and often not very effective. Accordingly, there are a number of disadvantages in grilling devices and systems that can be addressed.

BRIEF SUMMARY

Disclosed embodiments include grill configurations, in particular, solid fuel grill configurations, that perform various levels of self-cleaning functions. As solid fuel grills expend fuel, ash and various related debris can accumulate within the grill. The accumulation of this ash and debris can result in poor performance of the grill and in some cases dangerous fires. Embodiments disclosed herein provide novel solutions for reducing the effort required to clean a grill and to provide some level of self-cleaning functionality to a grill.

In at least one embodiment, a firepot for a grilling device comprises one or more walls at least partially forming an outer boundary of the firepot. The firepot is structurally configured to hold at least partially ignited solid fuel. The firepot also comprises a floor defining, at least in part, a lower end of the firepot. The floor comprises one or more holes extending through the floor. Additionally, a portion of the one or more walls form a solid fuel delivery opening that comprises a solid fuel portal through which solid fuel is deliverable to an interior of the firepot. A heating element mount is positioned to hold a heating element within the interior of the firepot.

Additionally, in at least one embodiment, a self-cleaning grilling device comprises an evacuation cavity and a grilling cavity. The grill cavity comprises a firepot that is structurally configured to hold at least partially ignited solid fuel. The self-cleaning grilling device also comprises one or more tunnels disposed in a cavity separator between the evacuation cavity and the grilling cavity. The one or more tunnels provide openings through which ash may be drawn from the grill cavity into the evacuation cavity.

Further, in at least one embodiment, a self-cleaning grilling device comprises an evacuation cavity positioned below a grilling cavity. The grill cavity is structurally configured to contain heat generated by solid fuel. The self-cleaning grilling devices also comprises one or more tunnels disposed in a cavity separator between the evacuation cavity and the grilling cavity. The one or more tunnels provide openings through which ash may be drawn from the grill cavity into the evacuation cavity.

Additional features and advantages of exemplary implementations of the present disclosure will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims or may be learned by the practice of such exemplary implementations as set forth hereinafter.

BRIEF DESCRIPTION OF THE DRAWINGS

In order to describe the manner in which the above-recited and other advantages and features of the present disclosure can be obtained, a more particular description of the present disclosure briefly described above will be rendered by reference to specific embodiments thereof which are illustrated in the accompanying drawings. Understanding that these drawings depict only typical embodiments of the present disclosure and are not therefore to be considered to be limiting of its scope, the present disclosure will be described and explained with additional specificity and detail through the use of the accompanying drawings in which.

DETAILED DESCRIPTION OF THE PREFERRED EMBODIMENTS

Figure 1:
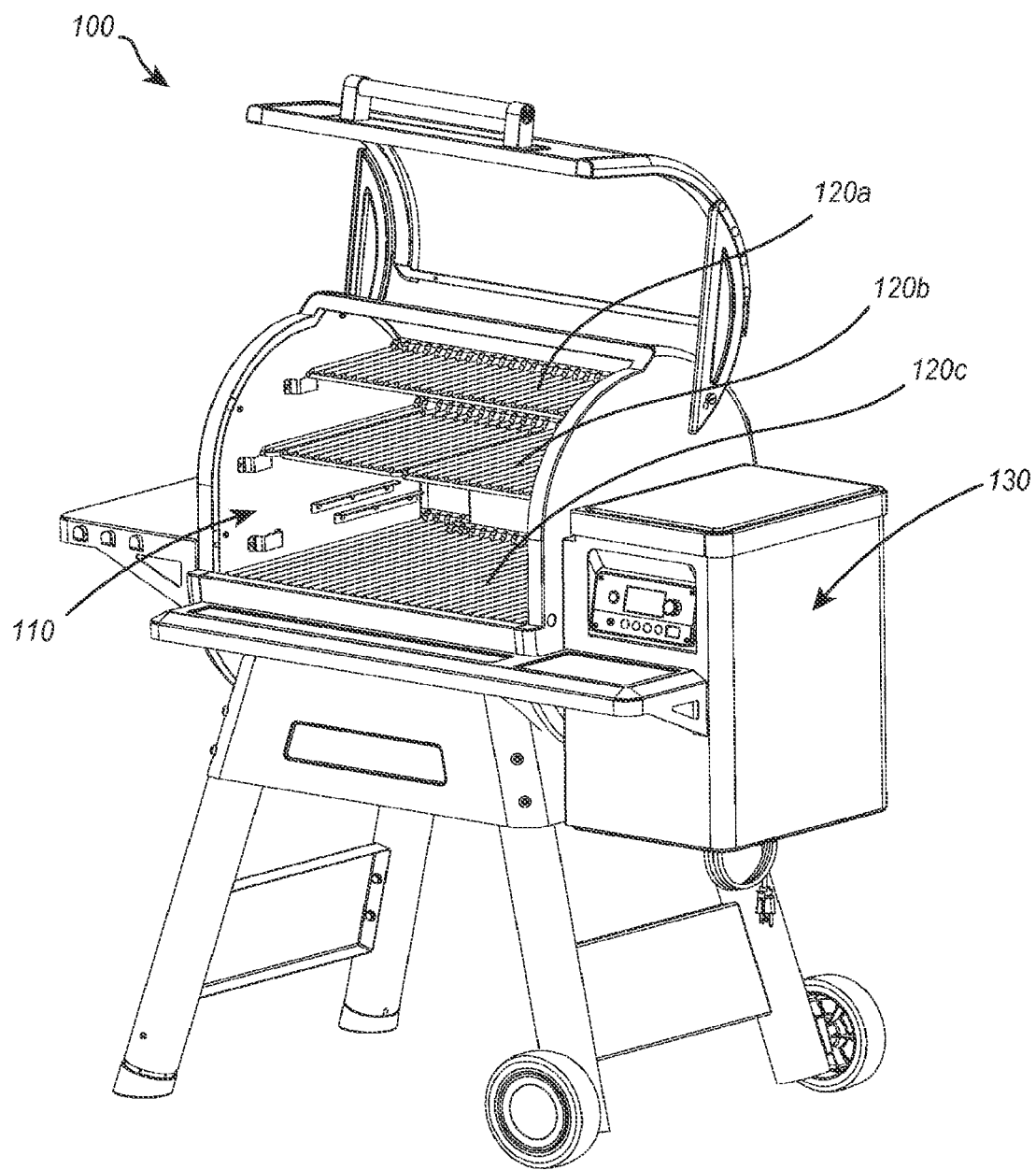
FIG. 1 depicts an embodiment of a self-cleaning solid-fuel grill in the form of a wood pellet grill.

The present disclosure relates generally to systems, methods, and devices for grilling and warming food products. In particular, implementations of the present disclosure relate to self-cleaning solid-fuel grills. Disclosed embodiments include grill configurations, in particular, solid fuel grill configurations that perform various levels of self-cleaning functions. As solid fuel grills expend fuel, ash and various related debris can accumulate within the grill. The accumulation of this ash and debris can result in poor performance of the grill and in some cases dangerous fires.

Self-cleaning grills of the present disclosure includes features that automatically and effectively remove ash, soot and creosote from the grilling cavity, thus avoiding unwanted build-up in the grill cavity and firepot. In at least one embodiment, users do not need to remove various components of the grill and manually clean out the ash build-up within the grill cavity of the grill. Instead, users can simply connect a vacuum nozzle, such as the nozzle of a home shop-vac, to an outlet of the grill and draw the ash out. As such, the self-cleaning pellet grill of the present disclosure can reduce ash build-up in the firepot and grilling cavity, resulting in more efficient and hotter fuel combustion. Users can clean out the ash effectively and without mess.

One will appreciate that in addition to the ash formed from the combustion of the fuel, the grill also produces smoke that comprises soot and creosote. The soot and creosote may build up within the grill cavity over time with repeated use of the grill, similar to the ash. As such, implementations of the present disclosure, as described herein, are directed toward the removal and cleaning of built-up ash as well as built-up soot and creosote. That is, the methods, apparatus and systems described herein that relate to the removal of ash build-up within the grill can also be effectively applied to help prevent the buildup of soot, creosote, and other byproducts of smoke and combustion within the grill due to the improved burn of solid fuels.

Embodiments disclosed herein describe novel firepots and solid fuel grill configuration that individually and together provide several advances in the art. For example, disclosed embodiments of firepots provide self-cleaning functionality and/or improved air flow for controlling the heat of ignited solid fuel. Additionally, disclosed embodiments include novel solid fuel grill configurations that allow for both passive and active self-cleaning. For instance, disclosed embodiments include gravity fed tunnels that allow ash and debris to naturally fall out of grilling portion of the solid fuel grill. Disclosed embodiments also include solid fuel grills that comprise allow for self-cleaning through a connector for a vacuum that allows ash to be actively drawn out of the solid fuel grill. One will appreciate that the benefits and examples provided herein are only provided for the sake of example. In practice, additional benefits that are not enumerated herein may also be associated with the disclosed embodiments.

Turning now to the figures, FIG. 1 depicts an embodiment of a solid-fuel grill, with self-clean capabilities, in the form of a wood pellet grill 100. In alternative embodiments, the wood pellet grill 100 may burn any form of solid fuel, including, for example, coal, non-pelletized wood, or paper. The wood pellet grill 100 comprises a grill cavity 110 for cooking food and igniting solid fuel. The depicted grill cavity 110 comprises various grates 120a-120c for holding the food above the at least partially ignited wood pellets (not shown). For example, combustion of fuel pellets within the firepot may comprise four stages. Within the first stage, the hot-rod heats up and the blower motor actuates air into the firepot causing moisture to evaporate out of the fuel pellets. During the second state, the hydro-carbons within the fuel pellets vaporize. During this state, the desirable smoke is produced. In the following third stage, gas vapor ignition occurs where the actual flame appears. During the fourth stage, char burns off producing ash.

The wood pellets are delivered to the interior of the wood pellet grill 100 by an auger (not shown) that feeds pellets from a pellet hopper 130. Accordingly, when the wood pellet grill 100 is in use, wood pellets are fed into the wood pellet grill 100 from the pellet hoppers 130 at a particular rate in order to reach or maintain a particular temperature. As the wood pellets are ignited and burned into the wood pellet grill 100 ash and other debris are generated. Over time the generated ash and other debris can accumulate and prevent the wood pellet grill 100 from properly operating. In some cases, the accumulation of the ash and debris can be dangerous and lead to unexpected fire events due to the wood pellet grill operating outside of intended parameters.

Figure 2:
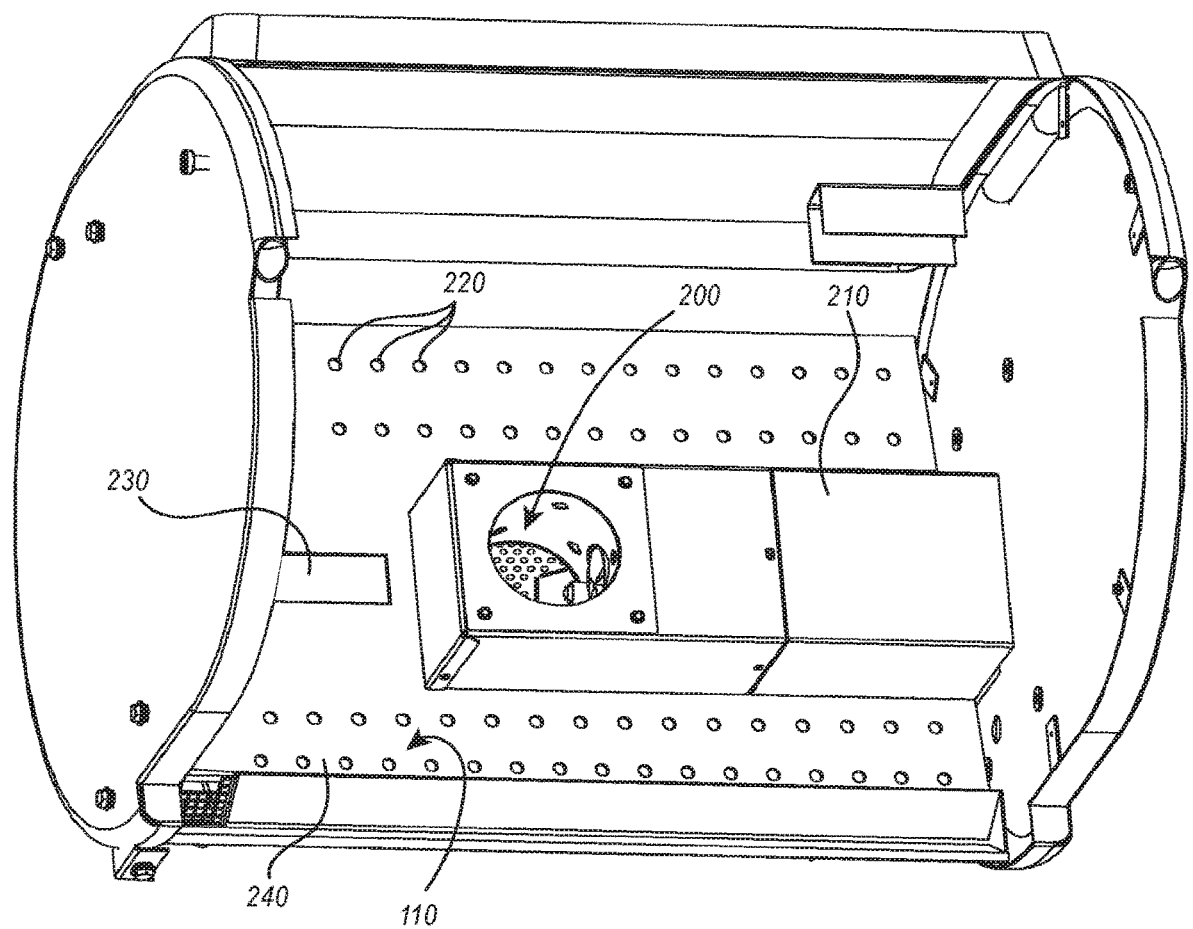
FIG. 2 depicts an embodiment of a grill cavity of a self-cleaning wood pellet grill.

FIG. 2 shows the grill cavity 110 of the wood pellet grill 100. The grill cavity 110 includes an auger box 210 and a firepot 200. The auger box 210 provides a conduit through which an auger (not shown) or other delivery device feeds wood pellets, or some other solid fuel, into the firepot 200 to be burned. In at least one embodiment, an auger inside the auger box 210 feeds the solid fuel into the firepot 200 through an opening in the side of the firepot 200. The auger may be driven by a variable motor such that the speed at which wood pellets are fed into the firepot 200 is controllable. In at least one embodiment, control of the auger allows a user or automatic temperature system to manage temperatures within the wood pellet grill 100.

FIG. 2 further shows that the grill cavity 110 can comprise a cavity separator 240 that forms a lower floor of the grill cavity 110. The cavity separator 240 may comprise various tunnels 220 that provide a passage through the cavity separator 240 and into an evacuation cavity (shown as "evacuation cavity 400" in FIG. 4). As depicted, the tunnels may comprise round tunnels 220, slit tunnels 230, or any other configuration of a tunnel that provides a passage through the cavity separator 240. The one or more tunnels 220 provide passages for ash and debris to fall through the cavity separator 240.

In some embodiments, the placement and configuration of the one or more tunnels 220 may provide specific benefits to the passage of ash and debris through the cavity separator 240. For instance, the slit tunnels 230 may allow larger chunks of debris and ash to fall through the cavity separator 240. In contrast, however, the slit tunnels 230 may also create structural weaknesses within the cavity separator 240 due to the larger hole-to-floor ratio associated with the relatively larger slit tunnels 230. The round tunnels 220, on the other hand, may provide relatively smaller tunnels for ash and debris to pass through, but provide increased structural strength compared to the slit tunnels 230.

In at least one embodiment, it may be desirable to place the slit tunnels 230 in the middle region of the cavity separator 240, while placing the smaller, circular tunnels around the edges of the cavity separator 240. Such a configuration may allow for the cavity separator 240 to have the greatest structural strength around its edges where it connects to the body of the wood pellet grill. This configuration may also provide larger slit tunnels 230 in the middle of the cavity separator 240 to allow larger ash and debris to pass through the cavity separator 240.

Figure 3:
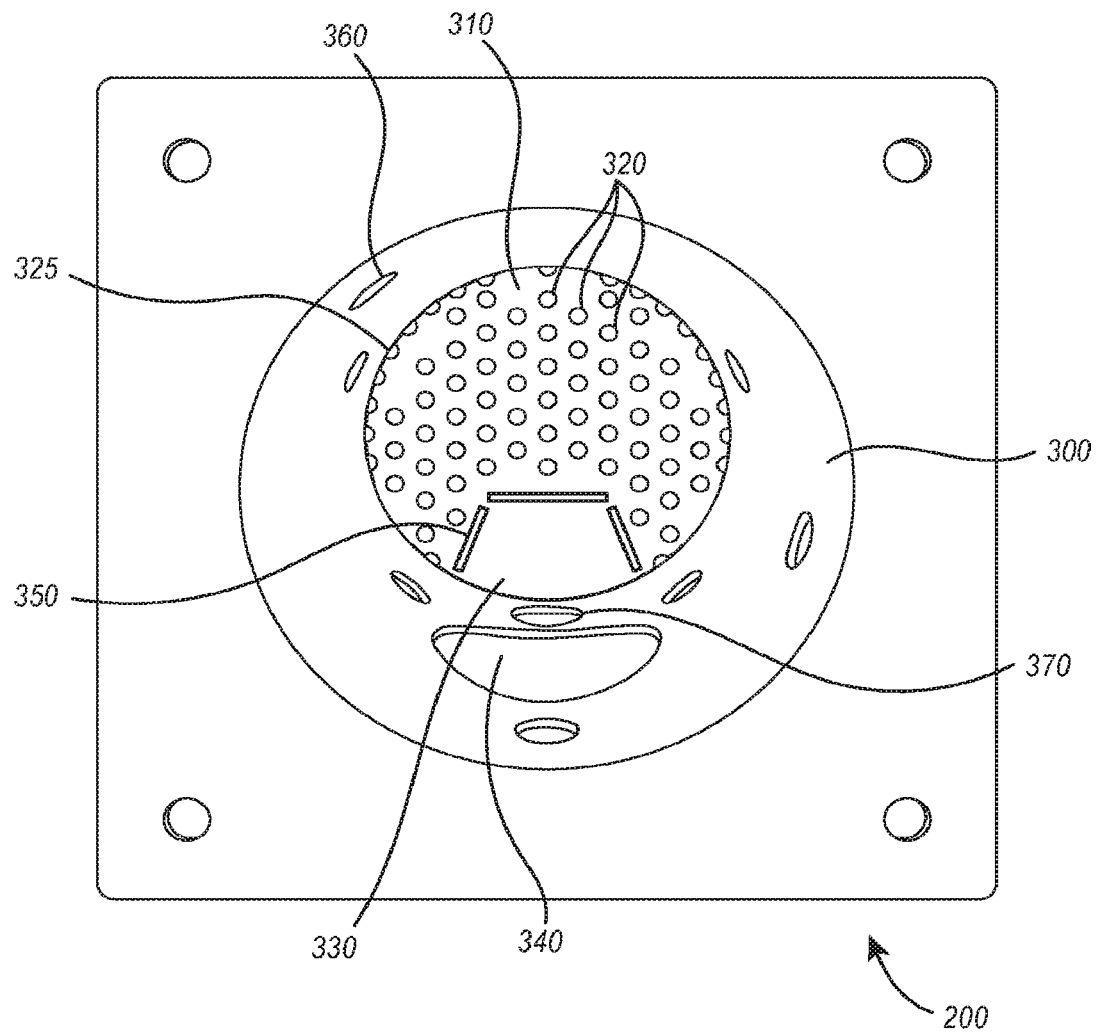
FIG. 3 depicts an embodiment of a firepot for a self-cleaning wood pellet grill.

FIG. 3 depicts an embodiment of a firepot 200 for a wood pellet grill. The depicted firepot 200 comprises a wall 300 that at least partially forms an outer boundary of the firepot 200. In the depicted embodiment, the firepot 200 comprises a cylindrical shape, but one will appreciate that other shapes, including oval, square, rectangular, or triangular, can also be used. The firepot 200 is structurally configured to hold at least partially ignited solid fuel. For example, the firepot 200 is structurally formed of materials that can withstand the heat generated by the burning of solid fuel, such as wood pellets. Additionally, different sizes and shapes of firepots 200 may allow for a greater or lesser amount of solid fuel to be ignited within the firepot 200.

The firepot 200 also comprises a floor 310 defining, at least in part, a lower end of the firepot 200. When in use, the floor 310 supports the solid fuel while it is being combusted. Additionally, as depicted, the floor 310 can comprise one or more holes 320 extending through the floor 310. The one or more holes 320 may serve a number of different functions including, but not limited to, allowing ash and debris to fall through the bottom of the firepot 200 and/or allowing a fan to blow air up in to the firepot 200 in order to deliver oxygen to the solid fuel and any fire within the firepot 200.

Additionally, in at least one embodiment, at least one of the one or more holes 320 comprises an intersected hole 325 that has been intersected by the wall 300. For example, in FIG. 3 the intersected hole 325 comprises a half circle that is defined as a half circle with respect to the floor 310 and the wall 300 that intersects the circle at its midpoint. As used herein, an intersected hole, or "one or more holes intersected by the wall," comprise any hole that has a direct boundary with the wall 300 such that the wall defines at least one edge of the hole.

Intersecting holes in this way provides several benefits to the firepot 200. For instance, in some cases, ash and debris can build up along the perimeter of the firepot 200. Such ash build-up can create problems relating to the combustion for solid fuel due to the blockage of air channels and/or the general displacement of uncombusted solid fuel. In at least one embodiment, intersecting holes with the wall of the firepot 200 provides a channel for ash and debris on the perimeter of the firepot 200 to fall through. As such, the holes can prevent ash and debris from building up along the perimeter of the firepot 200.

In at least one embodiment, a portion of the floor 310 comprises a landing zone 330 that consists of a continuous sheet of material. The continuous sheet of material is considered continuous due to its lack of holes. The landing zone 330 may also comprise landing zone boundaries 350 that form a boundary between the landing zone 330 and portions of the floor 310 that comprise the one or more holes 320. In the depicted embodiment, the landing zone boundary 350 comprises a raised surface that extends above a surface of the landing zone and into the interior of the firepot. As such, the landing zone boundary 350 comprises a physical barrier between the landing zone 330 and the remainder of the floor 310 that comprises the one or more holes 320. In at least one embodiment, the landing zone boundary 350 extends above the floor 1 mm-30 mm. Further, in at least one embodiment, the landing zone boundary 350 extends above the floor no more than the radius of an average wood pellet. Such a height prevents the wood pellet from easily rolling over the landing zone boundary 350, while at the same time allowing a stack of wood pellets to overflow the landing zone boundary 350.

In various additional or alternative embodiments, the landing zone 330 may be otherwise separated from the remainder of the floor 310 and the one or more holes 320. For example, the landing zone 330 may comprise a lowered portion of the floor 310. As such, the landing zone 330 may take the form of a bowl or cavity in the floor 310. In such an embodiment, the landing zone boundary 350 comprises the walls of the bowl or cavity.

In various embodiments, the landing zone 330 is placed in the direct line with the delivery mechanism for solid fuel. In particular, the landing zone 330 is placed such that when solid fuel is first delivered to the firepot 200 it lands in the landing zone 330. The land zone boundary 350 serves an impediment against scattering of the solid fuel. As such, in embodiments of the firepot 200 that comprise the landing zone 330 and landing zone boundary 350, solid fuel will tend to group within the landing zone 330.

Grouping solid fuel on the landing zone 330 in this way may provide for unique methods of generating smoke without entering the gas vapor ignition stage of combustion. For example, wood pellets may be delivered to the landing zone 330. Once at the landing zone 330, the wood pellets are not exposed to the one or more holes 320 in the floor 310. As such, less oxygen is available to the wood pellets in the landing zone 330. A heating element (not shown) can then heat the wood pellets to a high temperate without entering the gas vapor ignition stage due to the lack of oxygen and because the second stage of combustion (i.e., the vaporization of hydro-carbons) is an endothermic reaction, which causes the combustion stages to temporarily stall at the second stage. In at least one embodiment, under such circumstances, the wood pellets will generate smoke and remain within the second stage for a prolonged period of time, instead of progressing more quickly into the gas vapor ignition stage. Such a configuration may allow for low temperature smoke to be produced.

Returning now to FIG. 3, in at least one embodiment of the firepot 200, a portion of the wall 300 forms a solid fuel delivery opening 340. The solid fuel delivery opening 340 comprises a solid fuel portal through which solid fuel is deliverable to an interior of the firepot 200. The solid fuel delivery opening 340 may provide a passage for an auger, conveyor belt, shoot, or some other controllable transportation means for moving solid fuel into the firepot 200. In at least one embodiment, however, the firepot 200 does not comprise a solid fuel delivery opening 340, but instead solid fuel is dropped into the firepot 200 from the top open end.

In various additional or alternative embodiments, the firepot 200 comprises additional openings or features. For example, the firepot 200 may comprise a heating element mount 370 positioned to hold a heating element (not shown) within the interior of the firepot 200. The heating element may comprise an electric heating element, a ceramic-electric heating element, a gas fed flame heating element, or any other means for providing heat to the wood pellets. The heating element mount 370 can comprise any feature or opening configured to hold a heating element within the firepot 200. For example, the heating element mount 370 may comprise a hole (as shown in FIG. 3), a passageway, a welded mount, a bolted mount, or any other mechanical means for holding the heating element. In at least one embodiment, the heating element is held directly against the wood pellets. In contrast, in at least one embodiment, the heating element only provides indirect heat to the wood pellets.

In yet another embodiment, the firepot 200 may comprise air openings 360 in the wall 300 of the firepot. The air openings 360 may serve the function of delivering oxygen to the solid fuel within the firepot 200. The air openings 360 may be fed with a fan blowing air in to the firepot 200 or may passively allow oxygen to enter the firepot 200. The air openings 360 allow air to flow into the firepot 200 to facilitate combustion of the fuel in the firepot 200. The air openings 360 can also allow ash and debris to exit the firepot 200. The air openings 360 can therefore reduce the amount of ash and debris build-up inside the firepot 200. Other embodiments of a firepot 200 can include differing numbers of air openings 360. The diameter and shape of the air openings 360 can also vary. In at least one implementation, for example, the air openings 360 have a diameter of 1/16", while 1/8" in another, or 1/4" in still another. In some cases, the holes may even be 1/3 or 1/2 inch in diameter or higher.

Figure 4:
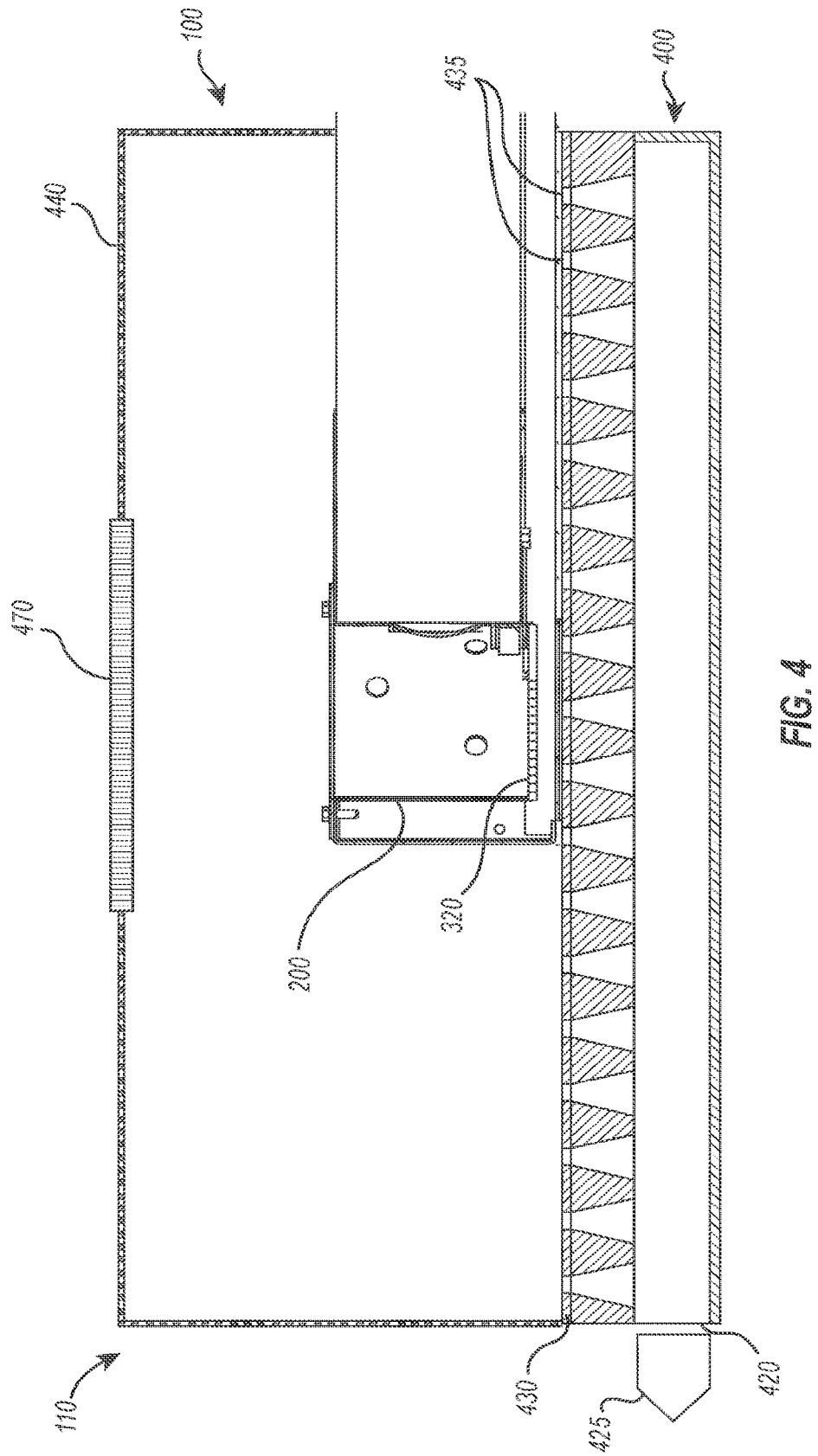
FIG. 4 depicts a cross-section of an embodiment of a self-cleaning wood pellet grill.

Turning now to a description of a wood pellet grill 100 that comprises a firepot 200, FIG. 4 depicts a cross-section of an embodiment of a self-cleaning wood pellet grill 100. In particular, the depicted portion comprises a cross sectional view of the grill cavity 110. In at least one embodiment, the grill cavity 110 can include an ash capture mechanism 440, such as a mesh screen that at least partially surrounds the firepot 200. The grill cavity 110 can also include a heat shield 470 configured to disperse heat emanating from the firepot 200 to avoid uneven hot-spots for warming or cooking food. FIG. 4 further shows that the grill cavity 110 can also include a cavity separator 430 with one or more tunnels 435 disposed therethrough. The one or more tunnels 435 are disposed in the cavity separator 430 and positioned between the evacuation cavity 400 and the grill cavity 110. The one or more tunnels 435 provide openings through which ash may be drawn from the grill cavity 110 into the evacuation cavity 400.

In at least one embodiment, the one or more tunnels 435 comprise cyclonic tunnels. The one or more tunnels 435 provide a passageway through which ash can pass from the grill cavity 110 to the evacuation cavity 400. In various other additional or alternative embodiments, the one or more tunnels 435 comprise other shapes. For example, the one or more tunnels 435 can comprise slit shapes, cylindrical shapes, square shapes, rectangular shapes, or any other shape that would allow ash and other debris to travel from the grill cavity 110 to the evacuation cavity 400. The number and spacing of the one or more tunnels 435 can vary depending on the configuration and needs of the wood pellet grill 100. For instance, some grills may be configured to burn relatively large wood pellets. In such a configuration, the one or more tunnels 435 may comprise larger diameters. Further, in at least one embodiment, a least a portion of the one or more tunnels 435 may comprise branches in the tunnel such that a tunnel comprises multiple entrances or exits.

FIG. 4 further illustrates that the evacuation cavity 400 can include a chamber into which the ash from the grill cavity 110 can fall via the one or more tunnels 435. The evacuation cavity 400 can comprise an outlet 420 through which ash can escape. In at least one implementation, the outlet 420 of the evacuation cavity 400 can be configured to communicate with a vacuum nozzle 425, such as the end of a shop-vac. A user can connect the vacuum nozzle 425 to the outlet 420 of the evacuation cavity 400 to draw out ash from the evacuation cavity 400.

In at least one embodiment, the one or more holes 320 in the floor 310 of the firepot 200 align with the one or more tunnels 435 in the cavity separator 430. For example, the one or more holes 320 may comprise the same dimensions and spacing as the one or more tunnels 435 and may further be aligned with the one or more tunnels 435 such that ash and debris within the firepot 200 can fall through the one or more holes and directly in the one or more tunnels 435.

In contrast, in at least one embodiment, the one or more holes 320 in the floor 310 of the firepot 200 may not completely align with the one or more tunnels 435 in the cavity separator 430. For example, the one or more holes 320 in the floor 310 of the firepot 200 may comprise a generally smaller diameter and a tighter distribution than the one or more tunnels 435 in the cavity separator 430. Additionally, in at least one embodiment, the floor 310 of the firepot 200 may be raised above the cavity separator 430. Ash and debris may fall through the one or more holes 320 in the floor 310 of the firepot 200 and onto the cavity separator 430. The debris on the cavity separator 430 may then via gravity fall through the one or more tunnels 435 or may be actively blown or sucked in the one or more tunnels 435 using a vacuum or a fan.

Additionally, in at least one embodiment, the firepot 200 sits within a hole in the cavity separator 430. In such a configuration, the one or more holes in the firepot 200 allow ash and debris to pass directly into the evacuation cavity 400. In such a configuration, the ash and debris from the firepot 200 does not pass through the one or more tunnels 435 in the cavity separator 430, but instead are directly disposed into the evacuation cavity 400.

Figure 5:
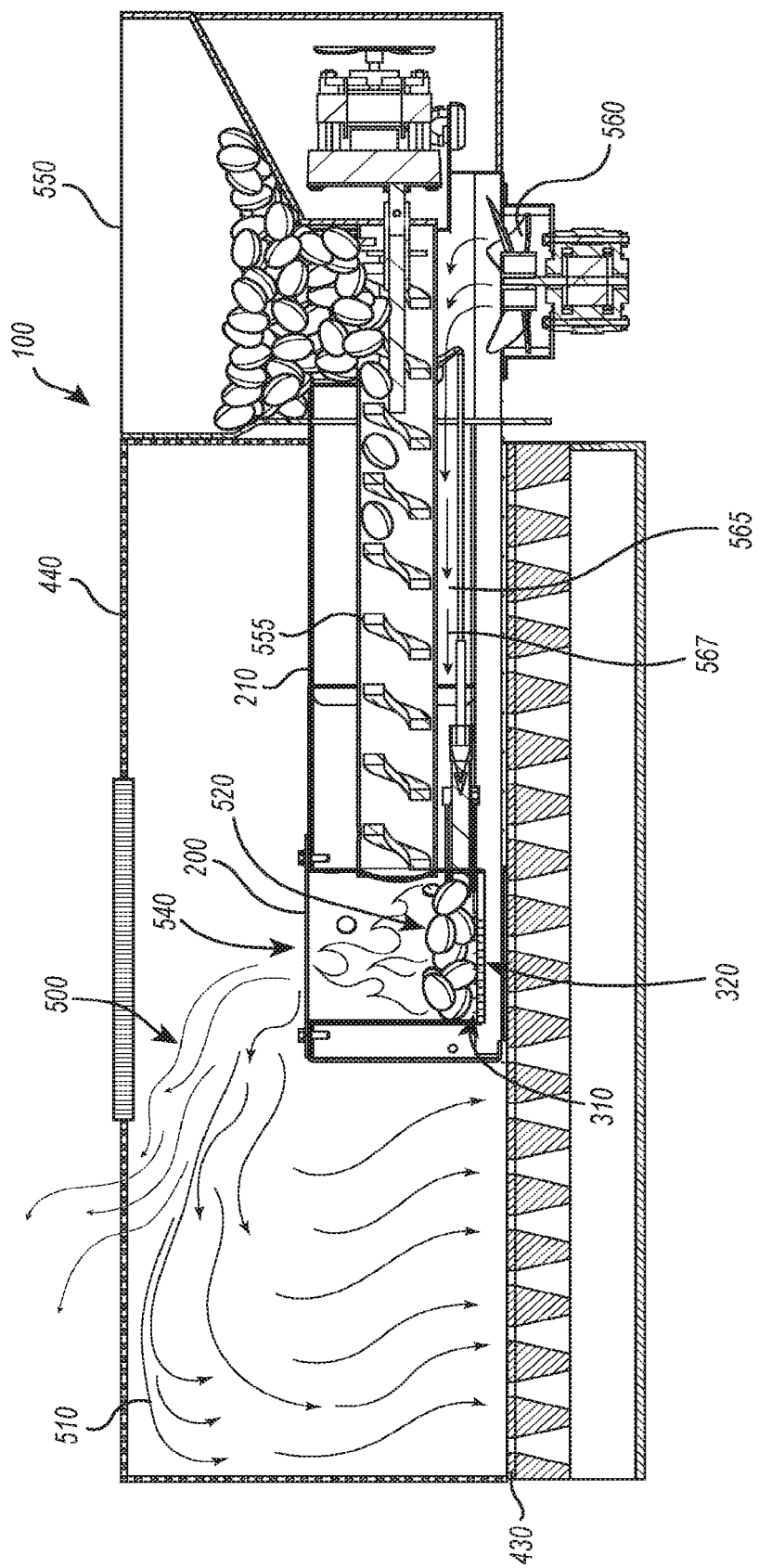
FIG. 5 depicts a cross-section of an embodiment of a self-cleaning wood pellet grill.

FIG. 5 depicts a wood pellet grill 100 with a firepot 200 that is holding at least partially ignited solid fuel 520. The solid fuel 520 is held in the firepot 200 above the one or more holes 320 in the floor 310 of the firepot 200. Oxygen may be directly delivered to the at least partially ignited solid fuel 520 through the one or more holes 320. Oxygen may also be delivered to the at least partially ignited solid fuel 520 through air openings (shown as 360 in FIG. 3) in the side of the firepot 200.

One will appreciate that placing the one or more holes 320 directly below the at least partially ignited solid fuel may provide an ideal means for delivering oxygen directly to any resulting fire. Additionally, providing such direct oxygen may also allow greater control over the intensity of any resulting fire. For instance, increasing air flow may cause a fire to grow. Additionally, in at least one embodiment, it is less likely that the one or more holes 320 in the floor 310 of the firepot 200 will be blocked by ash. As ash builds up within the firepot 200, the ash will tend to naturally fall through the one or more holes 320. The force of the air being blown through the one or more holes 320 may also encourage the ash to fall through the one or more holes 320.

As indicated in FIG. 5, as the solid fuel 520 burns, heat 500 emanates out of the firepot 200 toward the items that are being cooked. Additionally, ash 510 also emanates out of the firepot 200 through an ash expulsion portal 540. In the depicted embodiment, the ash expulsion portal 540 comprises the top opening of the firepot 200. In various additional or alternative embodiment, the ash expulsion portal 540 may be otherwise positioned or integrated into the firepot 200. In at least one embodiment, at least a portion of the ash 510 is blown out of the firepot 200 by a fan 560.

As depicted, the fan 560 is positioned external to the firepot 200 and is positioned to direct air through the one or more holes 320 extending through the floor 310 and into the firepot 200. In particular, in at least one embodiment, the firepot 200 is in physical communication with a pellet hopper 550 through an auger box 210 that houses an auger 555. The firepot 200 may also be in physical communication with a fan 560 through an air passage 565. The air passage 565 allows the fan 560 to blow oxygen 567 directly to a fire in the firepot 200 through the one or more holes 320 and into the firepot 200. By controlling both the flow of oxygen 567 and the delivery of wood pellets to the firepot 200 the intensity of any burning solid fuel can be closely controlled. One will appreciate, however, that the position and configuration of the pellet hopper 550, the auger 555, the fan 560, and the air passage 565 is only exemplary. In various additional or alternative embodiments each of the listed components may be other positioned or configured.

Returning now to the ash capture mechanism 440, in at least one embodiment, the ash capture mechanism 440 comprises a mesh screen. The mesh screen can be made of stainless steel, aluminum, silicon, steel, ceramic, iron, and/or combinations thereof, or non-metals such as non-flammable cloths or other non-flammable knitted materials or any other material capable of forming a mesh and remaining heat resistant to the temperatures reached with a solid fuel grill. For example, other implementations may include mesh screens made of other metals such as steel, ceramic, aluminum, iron, and/or combinations thereof, or non-metals such as non-flammable cloths or other non-flammable knitted materials. In any case, the mesh screen can preferably include a fine mesh that allows air and heat to pass through but not ash 510. Also, the mesh screen can preferably comprise a non-insulating material in order to encourage heat transfer through the mesh screen.

In at least one additional or alternative embodiment, the ash capture mechanism 440 can comprise a number of different types of filter mechanisms. For example, the ash capture mechanism 440 may comprise a fluid-based filter that passes the ash-filled air through flowing fluid. The flowing fluid then captures the ash and filters it out of the air. Additionally, the ash capture mechanism 440 may comprise an ionized filter that passes the ash 510 between charged plates. The electric charge associated with the ash will then cause the ash to be captured by the ionized filter. The ash capture mechanism 440 may also comprise a physical porous filter, such as cinder rocks, that allows hot air to pass through but captures the ash 510. Further, the ash capture mechanism 440 may comprise a mechanical filter that causes the air to move in such a way that the ash 510 falls out of the air. One will also appreciate that the ash capture mechanism 440 may also comprise a combination of any of the aforementioned filters.

The ash capture mechanism 440 may be positioned between the firepot 200 and the food cooking area of the wood pellet grill 100 such that the ash capture mechanism 440 prevents ash from falling on the food. One will appreciate that while blowing air through the one or more holes 320 in the bottom of the firepot 200 may cause the firepot 200 to self-clean, the air may also cause ash to be blown toward the food. Using an ash capture mechanism 440 can prevent the ash from contaminating the food.

Figure 6:
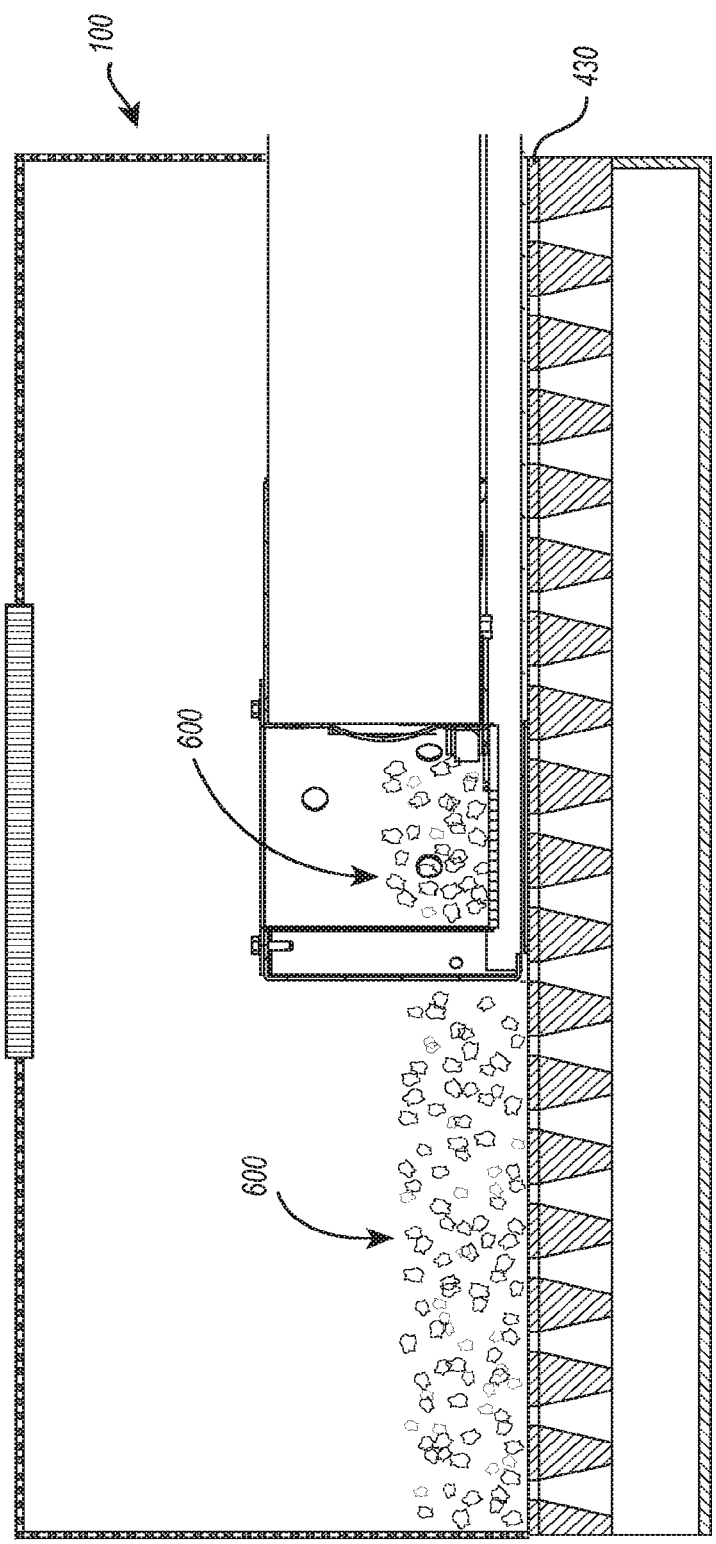
FIG. 6 depicts a cross-section of an embodiment of a self-cleaning wood pellet grill.

Turning now to FIG. 6, FIG. 6 shows ash and debris 600 build-up on the cavity separator 430 from burning fuel in the firepot 200. In at least one embodiment, a portion of the ash and debris 600 may naturally fall through the one or more tunnels 435 and into the evacuation cavity 400 below. However, at least a portion of the debris 600 may remain on the cavity separator 430. For example, ash that falls between the one or more tunnels 435 may remain on the cavity separator 430. In at least one embodiment, it may be necessary to use an active system to remove this ash from the wood pellet grill 100.

Figure 7:
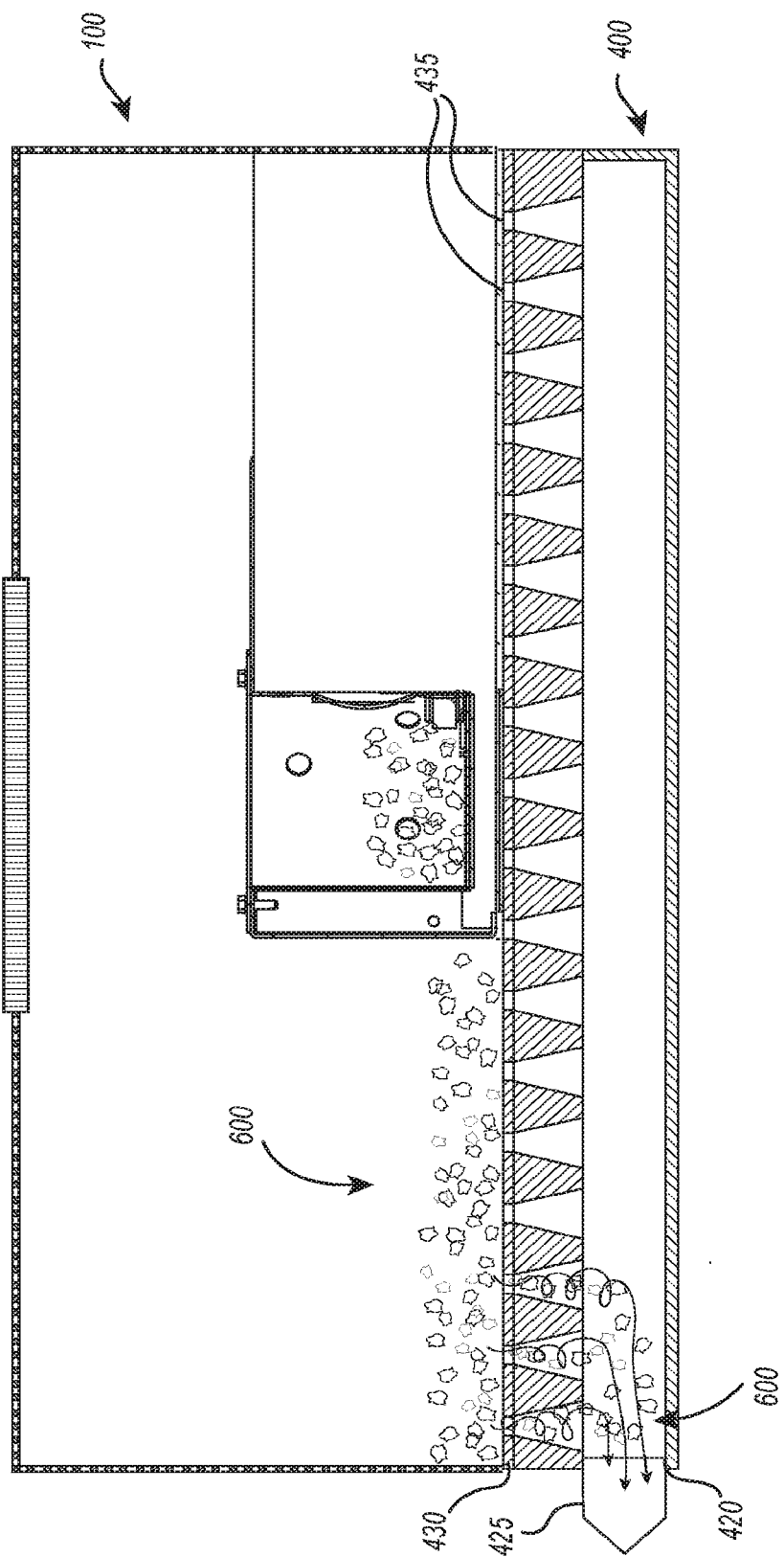
FIG. 7 depicts a cross-section of an embodiment of a self-cleaning wood pellet grill.

FIG. 7 now shows the ash and debris 600 exiting the grill cavity 110 through the one or more tunnels 435. In one embodiment, the ash and debris 600 on the cavity separator 430 can passively fall through the one or more tunnels into the evacuation cavity 400 simply due to gravity. The ash and debris 600 may also be actively drawn into the evacuation cavity 400.

For example, in at least one embodiment of the wood pellet grill 100, a user connects a vacuum nozzle 425 to the outlet 420 of the evacuation cavity 400 to create suction through the one or more tunnels 435, thus drawing the ash and debris 600 through the one or more tunnels 435 and into the evacuation cavity 400. A user can also connect a vacuum nozzle 425 to the outlet 420 in order to draw ash and debris 600 out of the evacuation cavity 400. In at least one embodiment, the outlet 420 can be configured to communicate with a household shop-vac or other vacuum, through the vacuum nozzle 425.

In at least one embodiment, the conical shape of the one or more tunnels 435 can cause the ash and debris 600 traveling through the one or more tunnels 435 to circulate through the one or more tunnels 435 in a cyclonic manner. The conical shape of the one or more tunnels 435 can amplify the suction force exerted on the ash and debris 600 within the grill cavity 110. In this way, the amplified suction force can effectively draw ash and debris 600 down through the one or more tunnels 435 to clear the ash and debris 600 out of the grill cavity 110. One will appreciate that in at least one embodiment, a vacuum can be physically integrated into the wood pellet grill 100 such that there is no need to attach an external vacuum.

Figure 8:
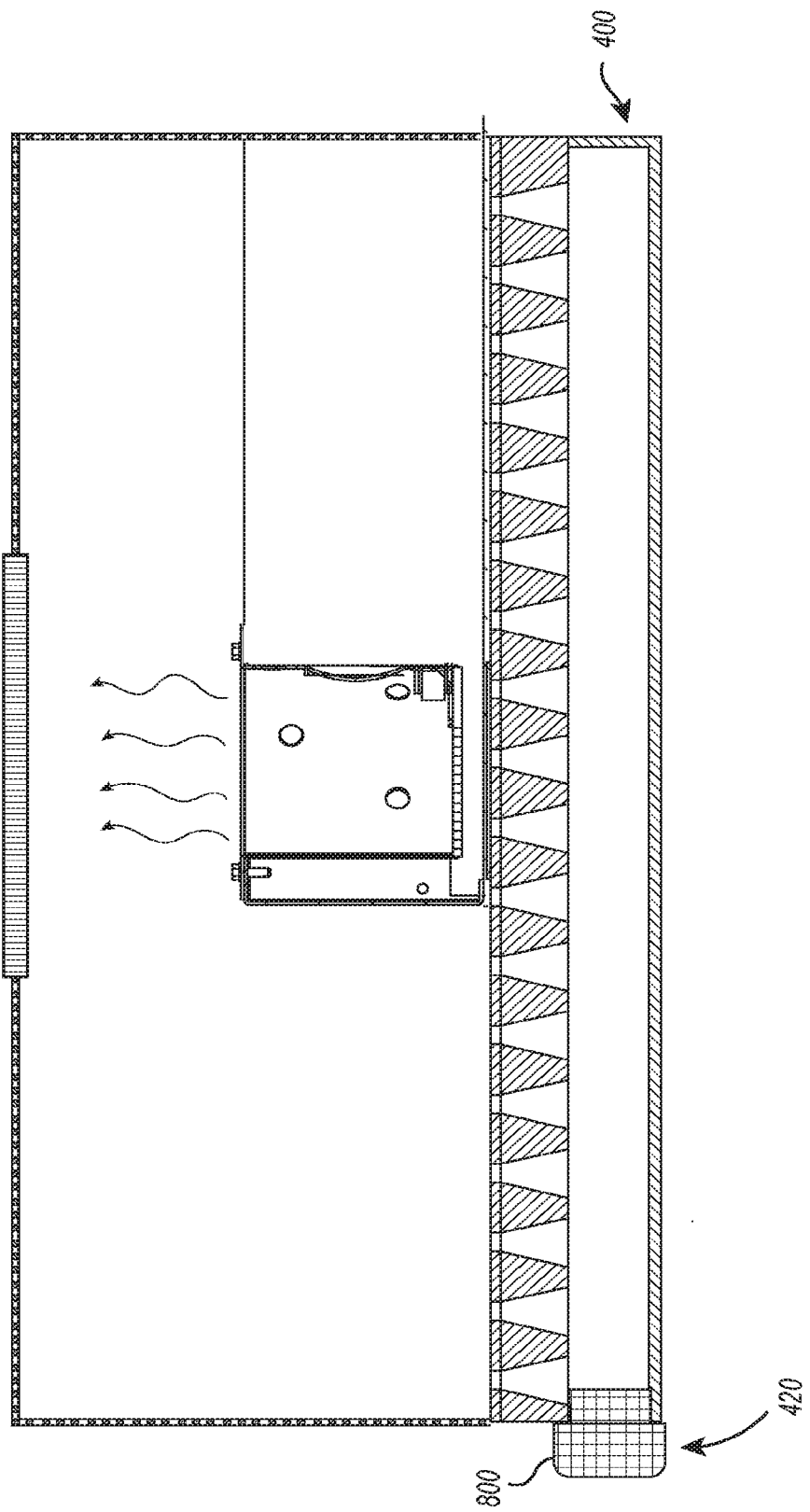
FIG. 8 depicts a cross-section of an embodiment of a self-cleaning wood pellet grill.

FIG. 8 shows a cap 800 disposed over the outlet 420 of the evacuation cavity 400. A user can put the cap 800 over the outlet 420 when the user is not cleaning the ash and debris 600 out of the evacuation chamber. The cap 800 can prevent insects, spiders, or other unwanted animals and/or debris from entering the evacuation cavity 400 when the user is not sucking out the ash and debris 600 with the vacuum nozzle 425.

Figure 9:
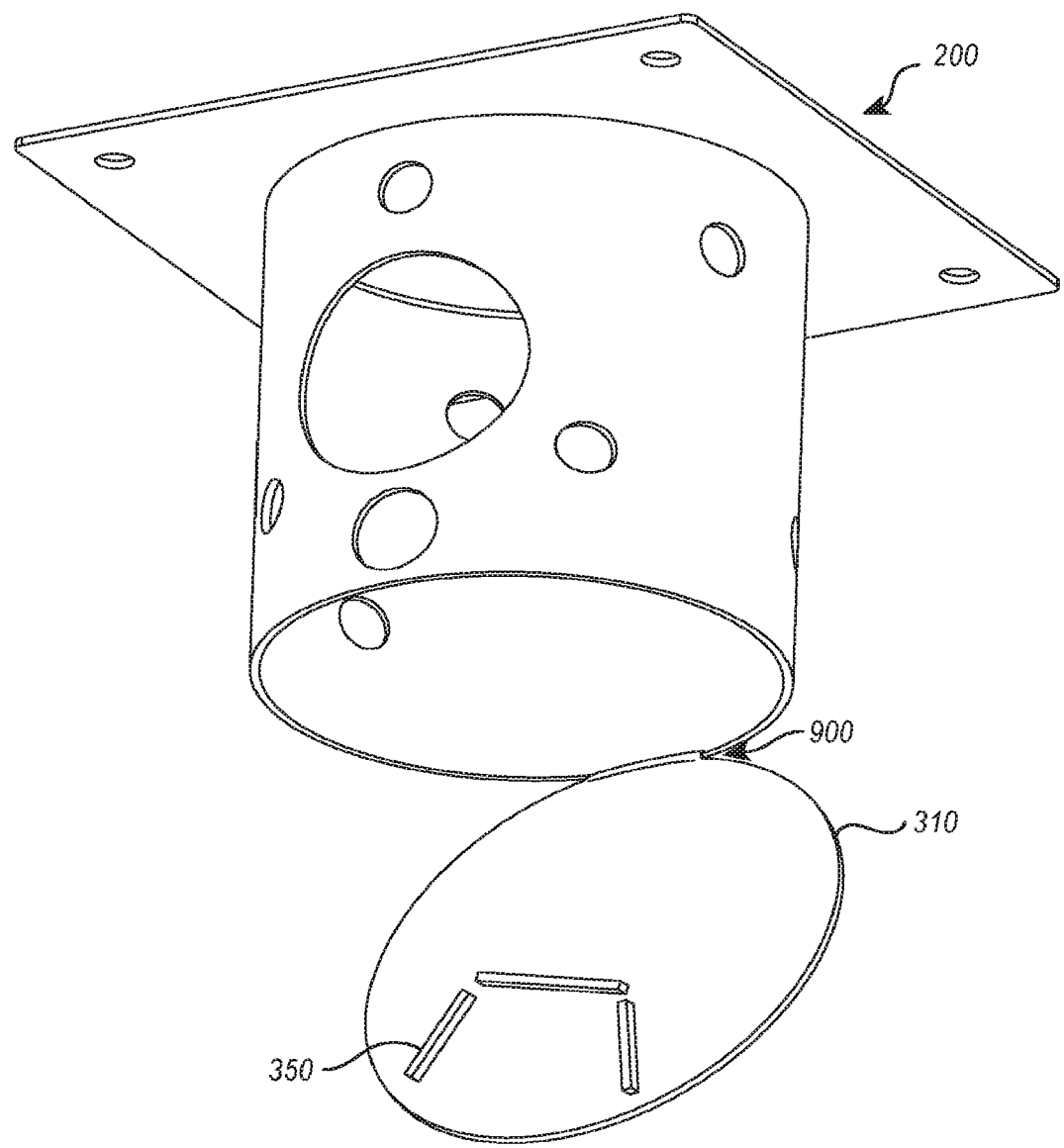
FIG. 9 depicts another embodiment of a firepot for a self-cleaning wood pellet grill.

One will appreciate that the embodiments described herein are merely exemplary and that other embodiments not explicitly described fall within the description and claims. For example, FIG. 9 depicts another embodiment of a firepot 200 for a self-cleaning wood pellet grill 100. The depicted firepot 200 comprises a floor 310 that is attached via a hinge 900 to the firepot wall. As such, in at least one embodiment, the one or more holes (shown as 320 in FIG. 3) comprises a single hole created when the floor 310 opens to expel ash and debris.

In at least one embodiment, the hinge 900 automatically actuates itself. For instance, some wood pellet grills 100 may comprise a cool down cycle that is engaged once a cooking cycle is complete. In such a grill, the hinge 900 may actuate itself at the end of the cook cycle, causing ash and debris to be dumped out of the firepot 200. In an additional or alternative embodiment, the hinge 900 may actuate itself after a specific number of cook cycles, based upon a sensor reading that the firepot 200 has a threshold amount of ash or debris in it, or anytime the grill is powered down.

Figure 10:
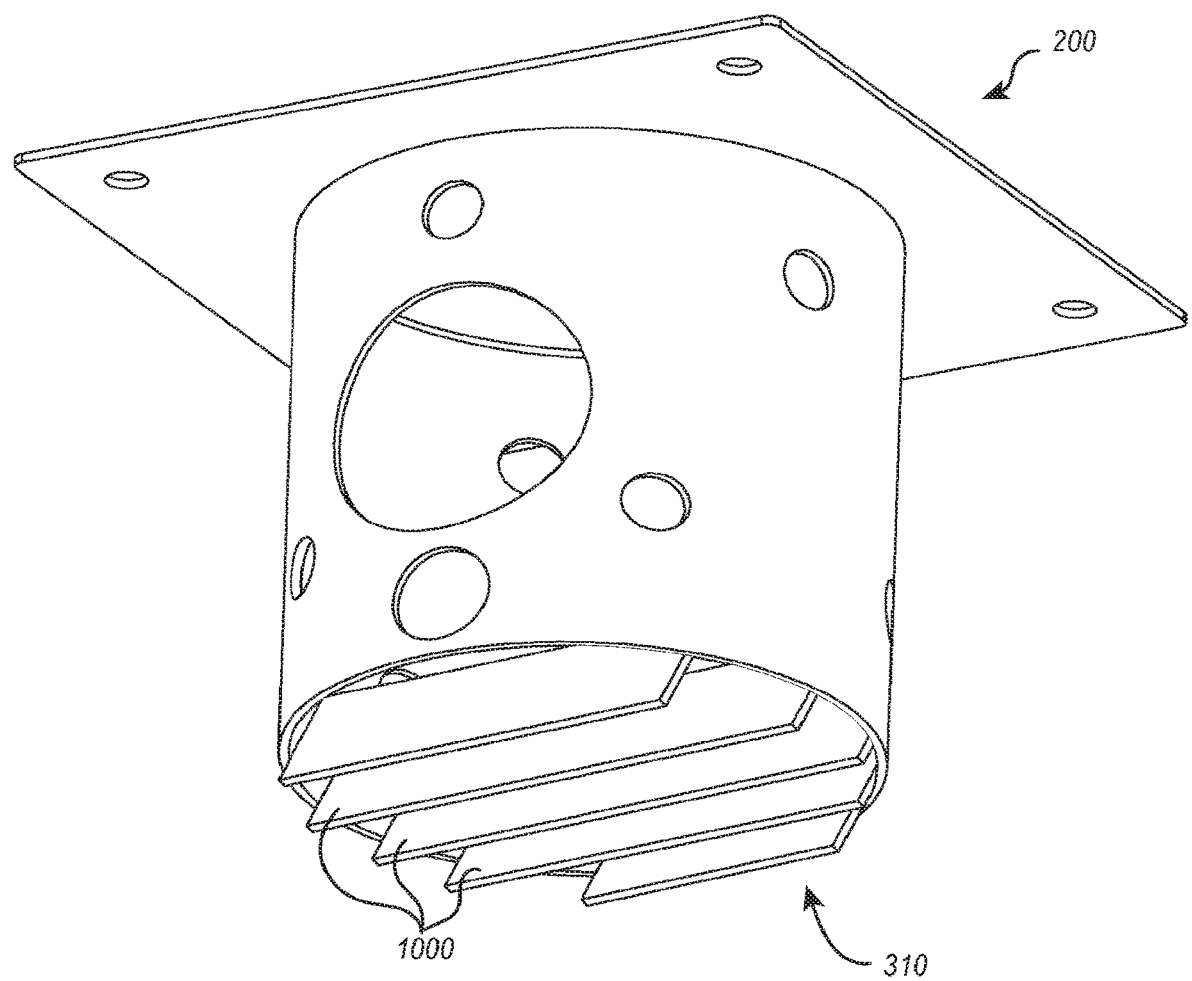
FIG. 10 depicts another embodiment of a firepot for a self-cleaning wood pellet grill.

FIG. 10 depicts another somewhat similar embodiment of a firepot 200 for a self-cleaning wood pellet grill 100. In this embodiment, the floor 310 of the firepot 200 comprises shutters 1000 that open and close. As such, the one or more holes 320 comprise the gaps between the open shutters 1000.

Each of the shutters 1000 may be actuated by a common motor or by multiple individual motors. The motors may be automatically actuated. For instance, some wood pellet grills 100 may comprise a cool down cycle that is engaged once a cooking cycle is complete. In such a grill, the motors may actuate themselves at the end of the cook cycle, causing ash and debris to be dumped out of the firepot 200. In an additional or alternative embodiment, the motors may actuate themselves after a specific number of cook cycles, based upon a sensor reading that the firepot 200 has a threshold amount of ash or debris in it, or anytime the grill is powered down.

Figure 11:
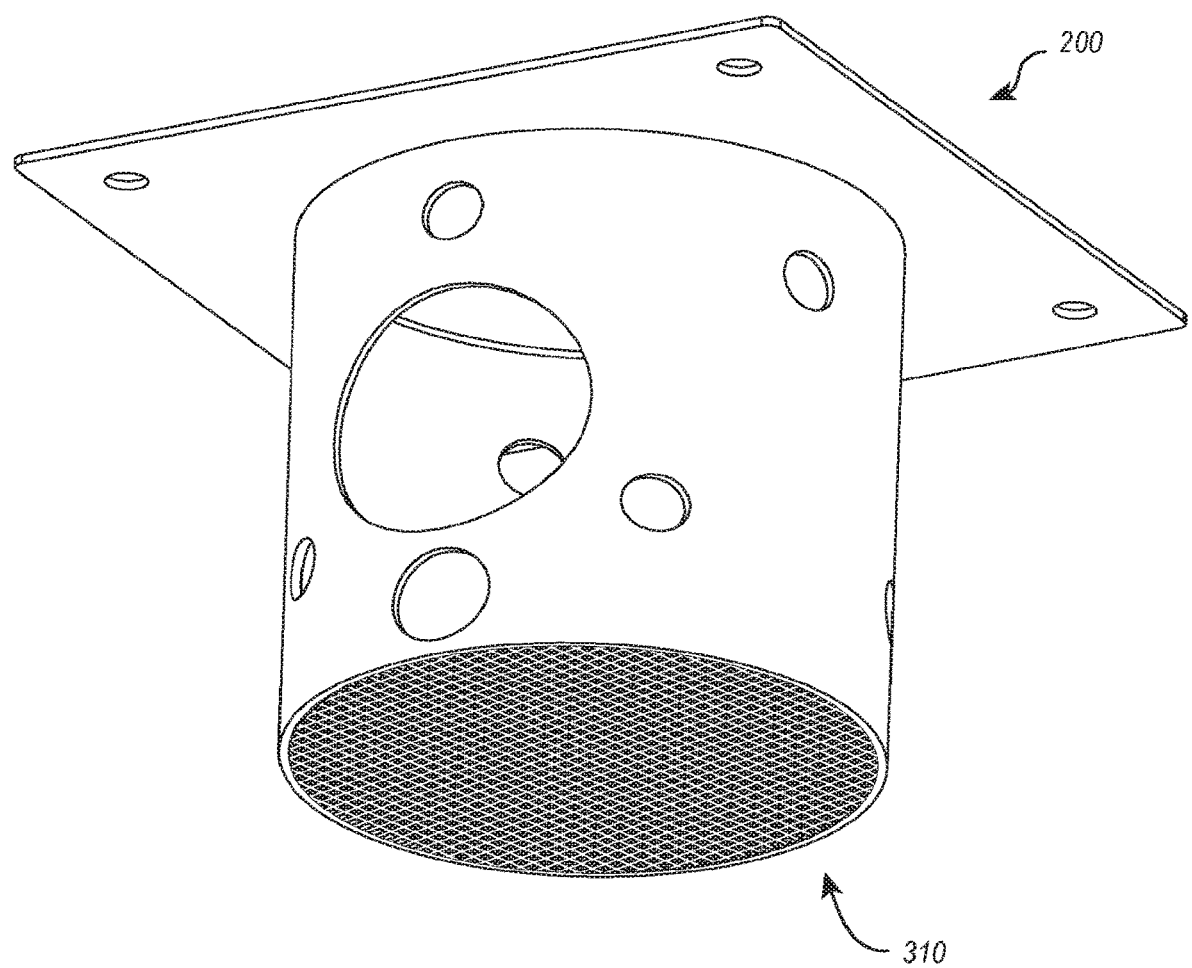
FIG. 11 depicts another embodiment of a firepot for a self-cleaning wood pellet grill.

FIG. 11 depicts yet another embodiment of a firepot 200 for a self-cleaning wood pellet grill 100. In this depicted embodiment, the floor 310 of the firepot 200 comprises a mesh screen. One will appreciate that a mesh screen can allow ash and debris to fall out naturally from the firepot 200 as the ash and debris accumulates. Additionally, ash and debris can be actively encouraged to fall through the mesh and/or be blown out of the firepot 200 with the fan 560 and/or vacuum described above.

Accordingly, embodiments of self-cleaning solid fuel grills disclosed herein provide several different means and systems for removing ash and debris from spent solid fuel. For example, disclosed embodiments teach unique firepots 200 that are configured to passively and/or actively remove ash and debris. Additionally, disclosed embodiments teach grill cavities and evacuation cavities for removing ash and debris from the interior grill cavity. One will appreciate that this disclosure includes several additional embodiments that extend beyond self-cleaning features.

The present disclosure can be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

We claim:

1. A grilling device, comprising:
    a grilling cavity comprising a firepot comprising a bottom surface;
    an evacuation cavity located below the firepot;
    a cavity separator located between the grilling cavity and the evacuation cavity, the bottom surface of the firepot in vertical alignment with and spaced apart from the cavity separator;
    one or more tunnels extending through the cavity separator, the evacuation cavity in direct communication with the grilling cavity through the one or more tunnels, openings in the bottom surface of the firepot vertically aligned with the one or more tunnels, wherein the one or more tunnels are individually shaped and configured to cause combustion byproducts generated within the firepot to exit the grilling cavity in a cyclonic path; wherein at least some of the one or more tunnels are positioned and configured to convey the combustion byproducts from the firepot to the evacuation cavity; and
    a screen physically contacting the cavity separator, the screen positioned laterally adjacent to and over the firepot and configured to direct ash and debris generated as the combustion byproducts within the firepot toward the evacuation cavity.

2. A self-cleaning grilling device, comprising:
    an evacuation cavity positioned below a grilling cavity;
    one or more conical-shaped tunnels disposed in a cavity separator between the evacuation cavity and the grilling cavity, the one or more conical-shaped tunnels providing openings through which ash and debris are drawn from the grilling cavity into the evacuation cavity;
    a firepot positioned within the grilling cavity, the firepot comprising openings extending through a floor defining a lower boundary of the firepot, the firepot overlying and remote from the cavity separator, and wherein the openings in the floor of the firepot are at least partially vertically aligned with the one or more conical-shaped tunnels; and
    a screen physically contacting the cavity separator, the screen positioned laterally adjacent to and over the firepot and configured to direct the ash and debris generated as a combustion byproduct within the firepot toward the evacuation cavity,
    wherein the floor of the firepot comprises one or more of a hinged portion, movable shutters, and a mesh screen.

3. The grilling device of claim 1, wherein the one or more tunnels are individually tapered such that a width of an upper boundary of one of the tunnels is relatively smaller than a width of a lower boundary thereof.

4. The grilling device of claim 1, wherein the one or more tunnels comprise multiple tunnels aligned in one or more rows.

5. The grilling device of claim 1, wherein the one or more tunnels comprise two or more conical-shaped tunnels configured to amplify a suction force exerted on the combustion byproducts within the grilling cavity to facilitate the combustion byproducts to be drawn from the grilling cavity to the evacuation cavity.

6. The grilling device of claim 1, wherein the one or more tunnels comprise elongated tunnels comprising a substantially rectangular cross-sectional shape in a central region of the cavity separator and circular tunnels in a peripheral region located between the central region and a perimeter of the cavity separator.

7. The grilling device of claim 1, wherein the openings in the firepot are configured to allow ash and debris of the combustion byproducts to fall through the bottom surface of the firepot toward the cavity separator.

8. The grilling device of claim 1, further comprising a fan adjacent to the evacuation cavity, wherein the fan is configured to circulate air through air openings in a wall of the firepot to allow the combustion byproducts to exit the firepot.

9. The grilling device of claim 1, further comprising an auger box positioned to provide fuel to the firepot, the auger box in vertical alignment with and spaced apart from the cavity separator.

10. The self-cleaning grilling device of claim 2, wherein at least some of the one or more conical-shaped tunnels comprise:
    an upper opening on a side of the cavity separator facing the grilling cavity; and
    a lower opening on a lower side of the cavity separator facing the evacuation cavity, a cross-sectional area of the lower opening relatively greater than a cross-sectional area of the upper opening.

11. The self-cleaning grilling device of claim 2, wherein the one or more conical-shaped tunnels of the cavity separator are relatively larger than the openings in the floor of the firepot, the one or more conical-shaped tunnels configured to allow the ash and debris to be carried by air circulating therethrough.

12. The self-cleaning grilling device of claim 2, wherein the cavity separator is configured to retain at least a portion of the ash and debris within the grilling cavity during operation of the self-cleaning grilling device and to allow the ash and debris to be drawn through the one or more conical-shaped tunnels and into the evacuation cavity following operation of the self-cleaning grilling device.

13. The self-cleaning grilling device of claim 2, wherein the evacuation cavity comprises an outlet in a sidewall thereof, the outlet configured to connect with a vacuum nozzle to facilitate the ash and debris in the evacuation cavity to be drawn out of the evacuation cavity.

14. The grilling device of claim 1, wherein the grilling cavity comprises one or more cooking surfaces for suspending food products over the firepot while grilling or warming the food products with the grilling device.

15. The grilling device of claim 1, wherein the grilling cavity includes a food cooking area, the firepot is positioned within the grilling cavity below the food cooking area, and the screen is positioned over the firepot between the firepot and the food cooking area.

16. The self-cleaning grilling device of claim 2, wherein the grilling cavity includes a food cooking area, the firepot is positioned within the grilling cavity below the food cooking area, and the screen is positioned over the firepot between the firepot and the food cooking area.

* * * * *